Patented Jan. 12, 1932

1,841,067

UNITED STATES PATENT OFFICE

GEORGE P. F. SMITH, OF STRAFFORD, AND THOMAS G. RICHARDS, OF WAYNE, PENNSYLVANIA, ASSIGNORS TO DISPERSIONS PROCESS, INC., OF DOVER, DELAWARE, A CORPORATION OF DELAWARE

MANUFACTURE OF RUBBER-FIBER PRODUCTS

No Drawing.   Application filed October 29, 1928.   Serial No. 315,919.

In the rubber reclaiming industry, a good deal of the vulcanized rubber scrap employed as a raw material is associated with a substantial proportion of fibrous material. A raw material such as pneumatic tires, for example usually contains about 20% to 30% fibrous material in the form of fabric. Heretofore, it has been the custom to destroy such fibrous material by the use of acids or alkalies in the process of reclaiming the rubber, owing to the difficulty and expense of effecting a complete separation of the fibrous material from the rubber.

In accordance with the present invention, the major portion of this fibrous material is salvaged and formed into useful products. To this end, the fibrous material present in vulcanized rubber scrap is roughly separated from the rubber, as a loose mass containing some of the rubber, and the fiber portion then mixed with a binding material to produce a mass which may be formed to the desired shape and then set. Various binders may be employed for this purpose, it being preferable to use aqueous dispersion of waterproof binders so that the dispersed material may be fixed on the fibers as by coagulation and the stock sheeted on a paper machine. Dispersions of thermoplastic materials such as asphalt, waxes, gums, resins and the like may be advantageously employed, but it has been found especially desirable to use aqueous dispersions of materials such as rubber which when coagulated from dispersion bond well with the vulcanized rubber present in the fiber. Hence the specification will deal more specifically with the use of aqueous rubber dispersions and fibrous material of the character described. The fibrous material may be readily mixed with aqueous rubber dispersions to produce a mass which may be formed to the desired shape and dried. If desired, the dispersed rubber may be coagulated on the fibrous material before forming and drying. This latter procedure is preferably followed when the mixture is sheeted on a paper machine or formed in foraminous moulds, as it avoids a loss of dispersed rubber along with the water passing through the forming wire of the paper machine or through the openings of the moulds. The presence of vulcanized rubber in the fibrous material not only serves to reduce the amount of rubber in dispersed condition necessary to produce rubber-fiber articles having the desired characteristics, but permits a better bonding of the fibers than would otherwise be obtained, as the residual vulcanized rubber clinging to the fibrous material intimately bonds with the rubber coagulated from the dispersion before or during drying.

A rough separation of fiber from rubber scrap may be readily effected as by cutting or chopping a raw material such as pneumatic tires into pieces of convenient size, passing the pieces through an attrition or grinding mill, and then through a separator, e. g. an air separator, which effects a separation of the loosened fibrous material with more or less attached rubber from the mass of rubber particles. The fibrous material thus roughly freed from vulcanized rubber may have a residual rubber content varying from 5% to 35%, depending upon the character of the raw material and the apparatus employed, most of the rubber clinging to the fibrous material and being visible in the form of dark particles. The fibrous material when derived from tire scrap is of exceptionally high quality, consisting of the long staple, high grade cotton customarily used in the manufacture of tire fabric.

When the fibrous material is to be treated with dispersed rubber and then sheeted on a paper machine, it is preferable to condition the fiber as is usually done when a raw material such as rags is employed. That is to say, the fibrous material may be cooked for a suitable period of time in water or alkaline liquors to soften the fiber and facilitate its conversion into a suitable half stock when subsequently beaten, whereupon it may be washed. The fiber may then be placed in a beater engine, together with sufficient water to ensure circulation, the beater roll initially being raised so as to permit a gradual conversion into a half stock, whereupon the roll may be gradually lowered so as to effect hard-beating of the fiber, this being continued until a half stock of the desired slowness or hydration is produced. To the beaten stock may then be added an aqueous dispersion of rubber containing the desired amount of rubber, based on the weight of fiber, and the dispersion uniformly disseminated throughout the mass of stock by the operation of the engine. After a uniform mixture has been effected, the dispersed rubber may be coagulated on the fibers, as by the addition of alum or other suitable electrolyte in amount sufficient to ensure the fixation of substantially all the dispersed rubber on the fibers. The coagulated rubber is firmly fixed to the vulcanized rubber particles and the beaten fibers, so that when the stock is subsequently sheeted on a paper machine or formed in moulds, little loss of dispersed rubber is experienced. If desired, the stock may be jordaned and screened, prior to sheeting or forming, in which case the fibers are first reduced in size, and coarse particles of rubber are then removed, so that the resulting product is of comparatively uniform and fine texture. The stock may be sheeted on a Fourdrinier machine, or on a cylinder machine where it may be wound on a make-up roll to the desired thickness. The wet sheet material may be compressed as by passing through calendar rolls or in a hydraulic press, and dried, or first dried and then compressed. Such sheet material may be used for a variety of purposes,—for instance, as a leather substitute in the manufacture of shoe midsoles, as a flooring material, or as a foundation for producing a substitute for upholstering leather or the like.

In the example given, the aqueous rubber dispersion may be rubber latex or artificial aqueous dispersions such as are producible with crude or reclaimed rubber and hydrophilic colloids of the character of casein, albumen, soap, clay, or the like. If desired, in addition to the rubber dispersion, suitable sizing material such as rosin soap may be added with the dispersion to the fibrous material, sufficient alum being used to fix the size and dispersed rubber on the fibers. The dispersion may contain vulcanizing agents, accelerators of vulcanization, and other compounding materials such as fillers and pigments, so that the product may be subsequently cured, if desired. For example, a final product in which the rubber has been cured to a hard condition may be prepared, a sheeted product of this type being serviceable as a substitute for bakelite, or hard wood such as ebony.

Where the stock is formed in moulds, the mixture may be subjected to heat and pressure during moulding, in which case the use of coagulating agents may be dispensed with, since heat and the evaporation of water from the stock result in coagulation of the rubber on the fibers. The stock may be moulded into various products, such as battery boxes, containers, tiling, and the like. When moulded products are being produced, economies may be effected if the fiber is used in unbeaten or only lightly beaten condition along with an aqueous dispersion of reclaimed rubber, it usually being of no particular moment in such products whether the fiber has been hydrated or whether the rubber is of the best quality, as is the case when sheet material suitable for use, for instance, as a leather substitute is to be produced from the stock on a paper machine.

Having thus described certain embodiments of this invention, it should be evident to those skilled in the art that various changes and modifications might be made therein without departing from the spirit or scope of invention as defined by the appended claims.

We claim:

1. A composition of matter comprising an aqueous dispersion of waterproof binding material and a loose mass of fibrous material containing vulcanized rubber, the components of said composition being proportioned to give a mass of flowable consistency.

2. A composition of matter comprising an aqueous dispersion of rubber and a loose mass of fibrous material containing vulcanized rubber, the components of said composition being proportioned to give a mass of flowable consistency.

3. A composition of matter comprising an aqueous dispersion of rubber and fibrous material roughly separated from vulcanized rubber with which it was associated, the components of said composition being proportioned to give a mass of flowable consistency.

4. A composition of matter comprising an aqueous dispersion of rubber and a loose mass of fibrous material containing about 5% to 35% vulcanized rubber, the components of said composition being proportioned to give a mass of flowable consistency.

5. A stock comprising beaten cellulose fibers roughly separated from vulcanized rubber with which said fibers were associated, and rubber coagulated on said fibers from an aqueous dispersion, the components of said composition being proportioned to give a mass of flowable consistency.

6. A process which comprises roughly separating fibrous material from vulcanized rubber with which it is associated, mixing such fibrous material and its rubber content with an aqueous dispersion of a waterproof binder, coagulating the binder on the fibers, forming to the desired shape, and drying.

7. A process which comprises roughly separating fibrous material from vulcanized rubber with which it is associated, mixing such fibrous material and its rubber content with an aqueous dispersion of rubber to produce a mass of flowable consistency, forming to the desired shape, and drying.

8. A process which comprises roughly separating fibrous material from vulcanized rubber with which it is associated, mixing such fibrous material and its rubber content with an aqueous dispersion of rubber to produce a mass of consistency, coagulating the dispersed rubber on the fibrous material, forming to the desired shape, and drying.

9. A process which comprises roughly separating fibrous material from vulcanized rubber with which it is associated, beating such fibrous material, mixing with an aqueous dispersion of rubber to produce a mass of flowable consistency, forming to the desired shape, and drying.

10. A process which comprises roughly separating fibrous material from vulcanized rubber with which it is associated, beating such fibrous material, mixing with an aqueous dispersion of rubber, coagulating the dispersed rubber, and sheeting on a paper machine.

11. A process which comprises roughly separating fibrous material from vulcanized rubber with which it is associated, cooking such fiber in an aqueous liquor, beating, mixing with an aqueous dispersion of rubber, coagulating the dispersed rubber, and sheeting on a paper machine.

12. A process which comprises roughly separating fibrous material from vulcanized rubber with which it is associated, beating such fibrous material, mixing with an aqueous dispersion of rubber, coagulating the dispersed rubber, screening to remove coarse particles of rubber, and sheeting on a paper machine.

13. A process which comprises roughly separating fibrous material from vulcanized rubber with which it is associated, beating such fibrous material, mixing with an aqueous dispersion of rubber, coagulating the dispersed rubber, jordaning, screening to remove coarse particles of rubber, and sheeting on a paper machine.

In testimony whereof we have affixed our signatures.

GEORGE P. F. SMITH.
THOMAS G. RICHARDS.